United States Patent [19]

Audry et al.

[11] Patent Number: 5,274,030
[45] Date of Patent: Dec. 28, 1993

[54] HOT WATER/SUPERHEATED STEAM-RESISTANCE EVOH BARRIER FILMS

[75] Inventors: Richard Audry, Beaumont Le Roger; Pierre Nogues, Bernay, both of France

[73] Assignee: Atochem, Puteaux, France

[21] Appl. No.: 982,000

[22] Filed: Nov. 24, 1992

Related U.S. Application Data

[63] Continuation of Ser. No. 641,726, Jan. 15, 1991, abandoned.

[30] Foreign Application Priority Data

Jan. 15, 1990 [FR] France ............... 90/00384

[51] Int. Cl.$^5$ ............... C08L 29/02; C08L 23/12; C08L 77/02
[52] U.S. Cl. .............................. 525/57; 525/59; 525/66; 525/240; 428/516; 428/520
[58] Field of Search ............ 525/57, 59, 66, 240; 428/516, 520

[56] References Cited

U.S. PATENT DOCUMENTS 3,975,463  8/1976  Hirata et al. .............. 260/897 B
5,061,751  11/1991  Patton ........................ 525/57

FOREIGN PATENT DOCUMENTS 0015556  6/1980  European Pat. Off. .
0342066  11/1989  European Pat. Off. .

Primary Examiner—James J. Seidleck
Assistant Examiner—W. R. H. Clark
Attorney, Agent, or Firm—Burns, Doane, Swecker & Mathis

[57] ABSTRACT

Hot water and superheated steam resistant barrier films, well adopted as packaging materials, e.g., for perishable comestibles, notably foodstuffs, at least in part include at least one layer of a polymer alloy comprising (a) at least one ethylene-vinyl alcohol (EVOH) copolymer, (b) at least one polypropylene and (c) a compatibilizing amount of at least one compatibilizing agent therefor.

9 Claims, No Drawings

HOT WATER/SUPERHEATED STEAM-RESISTANCE EVOH BARRIER FILMS

This application is a continuation of application Ser. No. 06/741,726, filed Jan. 15, 1991, now abandoned.

BACKGROUND OF THE INVENTION

1. Field of the Invention

The present invention relates to novel barrier films and, more especially, to novel barrier films that are resistant to hot water and superheated steam and that are well adopted for the packaging of food materials and perishable comestibles.

2. Description of the Prior Art

To ensure preservation of food products, it is necessary to assure not only protection against dust, but also against moisture, against some gases such as oxygen and carbon dioxide and against odors.

Polymeric resins are employed for this purpose, which are known as barrier resins, which have certain gas and water vapor permeability properties, namely, they are more or less permeable to gases and to water vapor.

Such films typically include one or more layers of polymers which are impervious to gases and of polymers which are impervious to water vapor.

Thus, when permeability to oxygen must be low, polymers are used having barrier properties in respect of this gas which are very high, such as, for example, ethylenevinyl alcohol (EVOH) copolymers, which are known to this art as being excellent materials in this regard.

If a sufficient protection against water vapor is to be provided, a barrier layer of polyolefins such as polypropylene is typically employed.

Since the requirements of imperviousness to gases and to water vapor vary from one form of packaging to another, and from one food product to another, the films employed may include one or more polymer layers which have different gas and water vapor permeability properties.

To improve the quality of "fresh" food products and to increase their preservation time, the food products must be packaged aseptically.

Many processes exist for this purpose. For example, pasteurization and sterilization are representative.

In these processes, the packaging—or the packaged food product—is subjected to the action of hot water (85° C.-100° C.) or to the action of superheated steam for periods of time ranging from a few seconds to several hours. For example, in the case of sterilization, the temperature attains a value of 121° C. or even 135° C. to 140° C. It is then necessary for the packaging, i.e., a film having one or more barrier layers, to withstand mechanically the combined action of water and of temperature, as well as the pressures, which may be as high as 3 to 4 bars.

It is found that at the time of the sterilization, or under the effect of hot water, certain films, especially those based on EVOH, undergo degradation, e.g., manifested as creasing of the affected layer or even a total delamination of the multilayer film.

SUMMARY OF THE INVENTION

Accordingly, a major object of the present invention is the provision of novel barrier films that are improvedly resistant to hot water and to superheated steam and which comprise, either wholly or in part, an alloy comprising (a) at least one ethylene-vinyl alcohol (EVOH) copolymer, (b) at least one polypropylene and (c) at least one compatibilizing agent therefor.

DETAILED DESCRIPTION OF THE PREFERRED EMBODIMENTS OF THE INVENTION

More particularly according to the present invention, the subject novel barrier films comprise an alloy containing at least 30% by weight of EVOH. Among such films, preferred are those shaped from alloys comprising:

(i) 42.5% to 99.5% by weight of EVOH,
(ii) 42.5% to 0.4% by weight of polypropylene, and
(iii) 0.1% to 15% by weight of compatibilizing agent.

The EVOH composition of the alloy is characterized by the fact that the matrix or dispersing phase is EVOH. The polypropylene is dispersed in such matrix in the form of more or less spherical nodules or of small cylindrical rods.

The adhesion (compatibility) between the phases is preferably ensured by including a compatibilizing amount of a graft copolymer based on an $\alpha$-monoolefin and designated a compatibilizing agent, which is described in European Patent Application No. 0,342,066, published Sep. 15, 1989, hereby incorporated by reference.

Among the compatibilizing agents noted in the above European patent application, preferred are the compatibilizing agents of the formula AMXP in which AM is a backbone copolymer prepared by copolymerizing propylene with $\alpha$-olefins, X is selected from among citraconic anhydride, fumaric acid, mesaconic acid, the anhydride of 3-allylsuccinic acid and maleic anhydride, and P is a polyamide oligomer prepared from caprolactam, 11-aminoundecanoic acid or dodecalactam.

The EVOH is a copolymer consisting essentially of ethylene and vinyl alcohol recurring structural units and may contain small amounts of other monomer units, in particular of vinyl ester units. These copolymers may be prepared by saponification or partial or complete alcoholysis of ethylene-vinyl ester copolymers. Among such vinyl esters, vinyl acetate is the preferred monomer. The degree of saponification or of alcoholysis is at least 90 mol % and preferably ranges from 94% to 99.5%. The molar proportion of ethylene in the EVOH ranges from 3% to 75% and preferably from 10% to 50%.

The polypropylene is a polymer consisting essentially of propylene units. It may contain a proportion (not exceeding 40 mol %) of another monomer unit, in particular of ethylene and/or one or more $\alpha$-olefins having from 4 to 6 carbon atoms. In particular, a homopolypropylene or a block propylene copolymer with 0.5 to 30 mol % of ethylene, or a random copolymer of propylene and ethylene containing 0.1 to 30 mol % of ethylene is employed.

Small amounts of other compounds of the stabilizer, antistatic agent or lubricant type and other polymeric compounds may be optionally added to the three principal constituents, which are EVOH, polypropylene and the compatibilizing agent.

Since the constituents are in the form of a powder or granules, the preparation of the alloy can be carried out in solution or in the molten state by means of a conversion machine of the single-screw or counter- or co-rotating twin-screw extruder type, or a roll mill.

The monolayer films according to the invention are wholly comprised of the above alloy.

The multilayer films include at least one layer of such alloy, the other layer or layers being polymers especially selected from among polyethylene (PE), polypropylene (PP), polyamide (PA), polyethylene terephthalate (PET) and polycarbonate (PC).

A coextrusion binder, which ensures better adhesion between the layers, must be employed in connection with certain polymers.

In the multilayer films according to the invention, the alloy layer may be external or internal.

The following films are exemplary multilayer films according to the invention:
PP/alloy/PP,
PP/coextrusion binder/alloy,
PP/coextrusion binder/alloy/coextrusion binder/PP,
PA/alloy.

The films according to the invention may be produced by flat extrusion or by film blowing at temperatures ranging from 200° C. to 260° C.

Other than the coextrusion techniques using a flat die or an annular die, the films in accordance with the invention can be processed by techniques such as extrusion coating and extrusion lamination, the latter technique making it possible, for example, to combine a film and a sheet of metal such as aluminum.

The films according to the invention which are produced from the alloy exhibit an improved resistance to hot water and to superheated steam.

Thus, the single-layer or multilayer films subjected to superheated steam at temperatures ranging from 100° C. to 140° C. at pressures ranging from 1 to 4 bars, retain their transparency and have a virtually intact surface appearance, whereas the same films consisting wholly or partially of EVOH become opaque and are striated, distorted or delaminated.

The films according to the invention consisting wholly or partially of the alloy can be used in the production of various packagings and most particularly they are useful for the manufacture of pouches, flexible envelopes, small tubs, pots, etc., for food packaging.

The films of this invention can also be used for the manufacture of membranes employed in the medical field, for applications such as haemodialysis or plasmaphoresis.

In order to further illustrate the present invention and the advantages thereof, the following specific examples are given, it being understood that same are intended only as illustrative and in nowise limitative.

EXAMPLES

Tests 1 to 5

(a) Five compositions were produced with the aid of a co-rotating twin-screw extruder, employing the following proportions of the constituents:

(i) EVOH: 99.3% hydrolyzed ethylene-vinyl acetate copolymer containing 32 mol % of ethylene, having a melt index of 3.2 g/10 minutes measured at 210° C. under 2.16 kg;

(ii) PP: random ethylene-propylene copolymer containing 3% by weight of ethylene of MI 2 g/10 minutes, measured at 230° C. under 2.16 kg;

(iii) compatibilizing agent: graft copolymer as indicated in Table I, prepared according to Example 1 of European Patent Application No. 0,342,066.

In this Table:

A is a structural unit derived from propylene,
M is a structural unit derived from ethylene,
X is a structural unit derived from maleic anhydride,
P is a caprolactam oligomer having a molecular weight of 2,700, determined by potentiometric determination of the end amine functional groups.

(b) These compositions were then extruded in the form of a 20-μm thick film by means of a single-screw extruder at a temperature ranging from 210° C. to 230° C.

These films were inspected using scanning electron microscopy (SEM) after cryogenic fracture (see Table I).

Because of the orientation due to the film extrusion, the disperse phase was in the form of small rods which were oriented in the extrusion (machine) direction: the size of the small rods was measured on the fractures after dissolving the disperse phase in xylene.

The assessment of the adhesion between phases was made qualitatively on the fractures.

TABLE I

| TESTS | COMPOSITION OF THE ALLOY (% by weight) | | | SEM INSPECTION OF THE ALLOY AS 20-μm THICK FILM |
|---|---|---|---|---|
| | EVOH | PP | COMPATIBILIZING AGENT | |
| 1 (comparative) | 85 | 15 | 0 | The pp was distributed in the EVOH matrix in the form of small cylindrical rods from 0.7 to 5 μm in cross-section. No adhesion between phases. |
| 2 (comparative) | 80.75 | 14.25 | $A_{663}M_{136}X_{0.65}$: 4 EVOH cont. 29 mol % of ethylene 1 — 5 | The PP was distributed in the EVOH matrix in the form of small cylindrical rods from 0.5 to 3 μm in cross-section. A weak adhesion existed between phases. |
| 3 | 80.75 | 14.25 | $A_{663}M_{136}X_{2.91}$ $P_{0.87}$: 5 | The PP was distributed in the EVOH matrix in the form of small cylindrical rods from 0.1 to 2 μm in cross-section. A strong adhesion existed between phases. |
| 4 | 85.5 | 9.5 | $A_{663}M_{136}X_{2.91}$ $P_{0.87}$: 5 | The PP was distributed in the form of the EVOH matrix in small cylindrical rods from 0.05 to 1.5 μm in cross-section. A strong adhesion existed between phases. |
| 5 (comparative) | 9.5 | 85.5 | $A_{663}M_{136}X_{2.91}$ $P_{0.87}$: 5 | The EVOH was distributed in the PP matrix in the form of small cylindrical rods from 0.1 to 2 μm in cross-section. A strong adhesion existed between phases. |

(c) Hot water resistance of single-layer films (1) Film composition

EXAMPLE 1 (Comparative)

Composition of the single-layer film: 100% of ethylene-vinyl alcohol copolymer containing 32% of ethylene (melt index: 3.2 g/10 minutes, measured at 210° C. under 2.16 kg).

EXAMPLE 2

Composition of the single-layer film according to the invention: 100% of the alloy which had the following composition by weight:
EVOH of Example 1: 80.75%
PP: random ethylene-propylene copolymer containing 3% of ethylene (MI: 10°-230° C./2.16 kg): 14.25%
compatibilizing agent $A_{663}M_{136}X_{2.91}P_{0.87}$: 5%.

EXAMPLE 3 (Comparative)

Composition of the single-layer film: 100% of ethylene-vinyl alcohol copolymer containing 44 mol % of ethylene (MI: 3.5–210/2.16 kg).

EXAMPLE 4

Composition of the single-layer film according to the invention: 100% of the alloy which had the following weight composition:

| | |
|---|---|
| EVOH of Example 3 | 80.75% |
| Polypropylene of Example 2 | 14.25% |
| Compatibilizing agent of Example 2 | 5%. |

EXAMPLE 5

Film which had the composition of the film of Example 2, but produced by blow extrusion.

(2) Conditions of the Hot Water Behavior Tests

The films were stretched in a transparency frame and were then immersed for 30 minutes in a bath of distilled water at constant temperature and gently stirred using a bar magnet.

Assessment of the Results

At the end of the test, film appearance and transparency were assessed according to the following arbitrary classification:

| Appearance: | Transparency |
|---|---|
| A: unchanged | from 1: unchanged |
| B: streaked | to |
| C: creased | 4: opaque. |
| D: perforated | |

Thus, a film which was unchanged in appearance and opaque will be classified as A4.

The results are reported in Table II:

TABLE II

| | Water temperature (under 1 bar) | | |
|---|---|---|---|
| EXAMPLES | 80° C. | 90° C. | 95° C. |
| 1 (Comparative) | A1 | D4 | D4 |
| 2 | A1 | B3 | C3 |
| 3 (Comparative) | A1 | A1 | D4 |

TABLE II-continued

| | Water temperature (under 1 bar) | | |
|---|---|---|---|
| EXAMPLES | 80° C. | 90° C. | 95° C. |
| 4 | A1 | A2 | B2 |
| 5 | A1 | A1 | A2 |

The single-layer films according to the invention—Examples 2, 4 and 5—exhibited a better behavior towards hot water than the single-layer films based on EVOH—Examples 1 and 3. The best results were obtained using the alloy based on EVOH containing 32 mol % of ethylene (Example 5).

(d) Superheated Steam (Sterilization) Resistance (1) Film composition

EXAMPLE 6 (Comparative)

Composition of the single-layer film: as in Example 1.

EXAMPLE 7

Composition of the single-layer film: as in Example 2.

(2) Conditions of the Superheated Steam Behavior Tests

The tests, carried out at a temperature equal to or higher than 100° C., were performed in an autoclave.

The films, stretched in a stainless steel frame (5×5 cm), were arranged in the autoclave and subjected for 30 minutes to the test conditions which may take place either in saturated steam or in superheated water.

In the case where the test was carried out using superheated water, the water was preheated in a storage vessel adjoining the autoclave and was then quickly introduced into the autoclave by means of a device designed for this purpose.

In the case of the tests carried out with superheated steam, the pressures ranged from 1 to 3 bars.

Assessments of the Results

The arbitrary classification indicated above in the case of the hot water behavior tests was employed.

Results

Temperature of the superheated steam: 120° C.

EXAMPLE 6 (Comparative):

D4

EXAMPLE 7

(e) Resistance of Three-layer Films to Superheated Steam (1) Film composition

Three-layer films whose composition and thicknesses are reported in Table III were obtained by blow coextrusion.

TABLE III

| | EXAMPLES | |
|---|---|---|
| LAYER COMPOSITION | 8 | 9 |
| Layer 1: copolymer X | 40 μm | 40 μm |
| Layer 2: EVOH of Example 3 | 10 μm | |
| Layer 2: alloy of Example 2 | | 10 μm |
| Layer 3: copolymer X | 40 μm | 40 μm |

In this Table, copolymer X denotes a coextrusion binder (propylene-ethylene copolymer grafted with maleic anhydride).

These tests were carried out on a three-layer blow coextrusion equipment.

(2) Coextrusion conditions

Extruder 1 (copolymer X):
temperature: 210° C.-230° C.
screw speed: 132 rev/min
Extruder 2 (copolymer X):
temperature: 210° C.-230° C.
screw speed: 122 rev/min
Extruder 3 (alloy or EVOH):
temperature: 210° C.-230° C.
Die:
diameter: 150 mm
blow ratio: 8.12
temperature : 220° C.
Draw speed: 8.83 m/min.
The results are reported in Table IV:

TABLE IV

| EXAMPLES | Temperature of the superheated steam | |
|---|---|---|
| | 120° C. | 133° C. |
| 8 | A4 | A4 |
| 9 | A2 | A3 |

(f) Resistance of Five-layer Films to Superheated Steam (1) Film composition

Five-layer films whose composition and thicknesses are reported in Table V were obtained by flat coextrusion:

TABLE V

| EXAMPLES | Layer composition | | |
|---|---|---|---|
| | 10 | 11 | 12 |
| Layer 1: PP | 75 μm | 50 μm | 50 μm |
| Layer 2: coextrusion binder | 20 μm | 10 μm | 10 μm |
| Layer 3: alloy of Example 2 | 20 μm | 10 μm | |
| Layer 3: EVOH cont. 38 mol % of ethylene | | | 10 μm |
| Layer 4: coextrusion binder | 20 μm | 10 μm | 10 μm |
| Layer 5: PP | 75 μm | 50 μm | 50 μm |

(2) Coextrusion conditions

These tests were carried out on a five-layer coextrusion equipment.
Extruder (PP):
temperature: 200° C.-245° C.
Extruder (coextrusion binder):
temperature: 220° C.-245° C.
Extruder (EVOH or alloy):
temperature: 215° C.-245° C.
Die:
gap: 0.7 mm, width 2 m
temperature: 250° C.

The results are reported in Table VI:

TABLE VI

| EXAMPLES | TEMPERATURE OF THE SUPERHEATED STEAM 130° C. |
|---|---|
| 10 | A1 |
| 11 | A1 |
| 12 | C4 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

We claim:

1. A polymer alloy comprising (a) an oxygen-barrier effective amount of at least one ethylene-vinyl alcohol (EVOH) copolymer; (b) a water vapor-barrier effective amount of at least one polypropylene, and (c) a compatibilizing amount of at least compatibilizing agent therefore comprising a graft copolymer having the formula AMXP in which AM comprises a propylene-/α-olefin backbone copolymer, X comprises a citraconic anhydride, fumaric acid, mesaconic acid, 3-allysuccinic acid anhydride or maleic anhydride structural unit, and P comprises a polyamide oligomer of caprolactam, 11,-aminoundecanoic acid or dodecalactam.

2. A hot water and superheated steam resistant film member comprising the polymer alloy as defined by claim 1.

3. The film member as defined by claim 2, said polymer alloy comprising at least 30% by weight of EVOH.

4. The film member as defined by claim 3, said polymer alloy comprising from 42.5% to 99.5% by weight of EVOH, from 0.2% to 42.5% by weight of polypropylene, and from 0.1% to 15% by weight of said compatibilizing agent.

5. The film member as defined by claim 3, the EVOH of said polymer alloy comprising from 3% to 75% of ethylene.

6. The film member as defined by claim 5, the EVOH of said polymer alloy comprising 10% to 50% of ethylene.

7. The film member as defined by claim 3, comprising a matrix of said EVOH, with said polypropylene being dispersed therein in the form of essentially spherical nodules or cylindrical rods.

8. A monolayer film consisting essentially of the film member as defined by claim 3.

9. The film member as defined by claim 2, wherein the at least one ethylene-vinyl alcohol copolymer is a saponification or alcoholysis product of an ethylene-vinyl ester copolymer having a degree of saponification or alcoholysis of from 94% to 99.5%.

* * * * *